Sept. 5, 1944.  I. H. PALMER  2,357,540
COUPLING DEVICE
Filed June 29, 1943  2 Sheets-Sheet 1
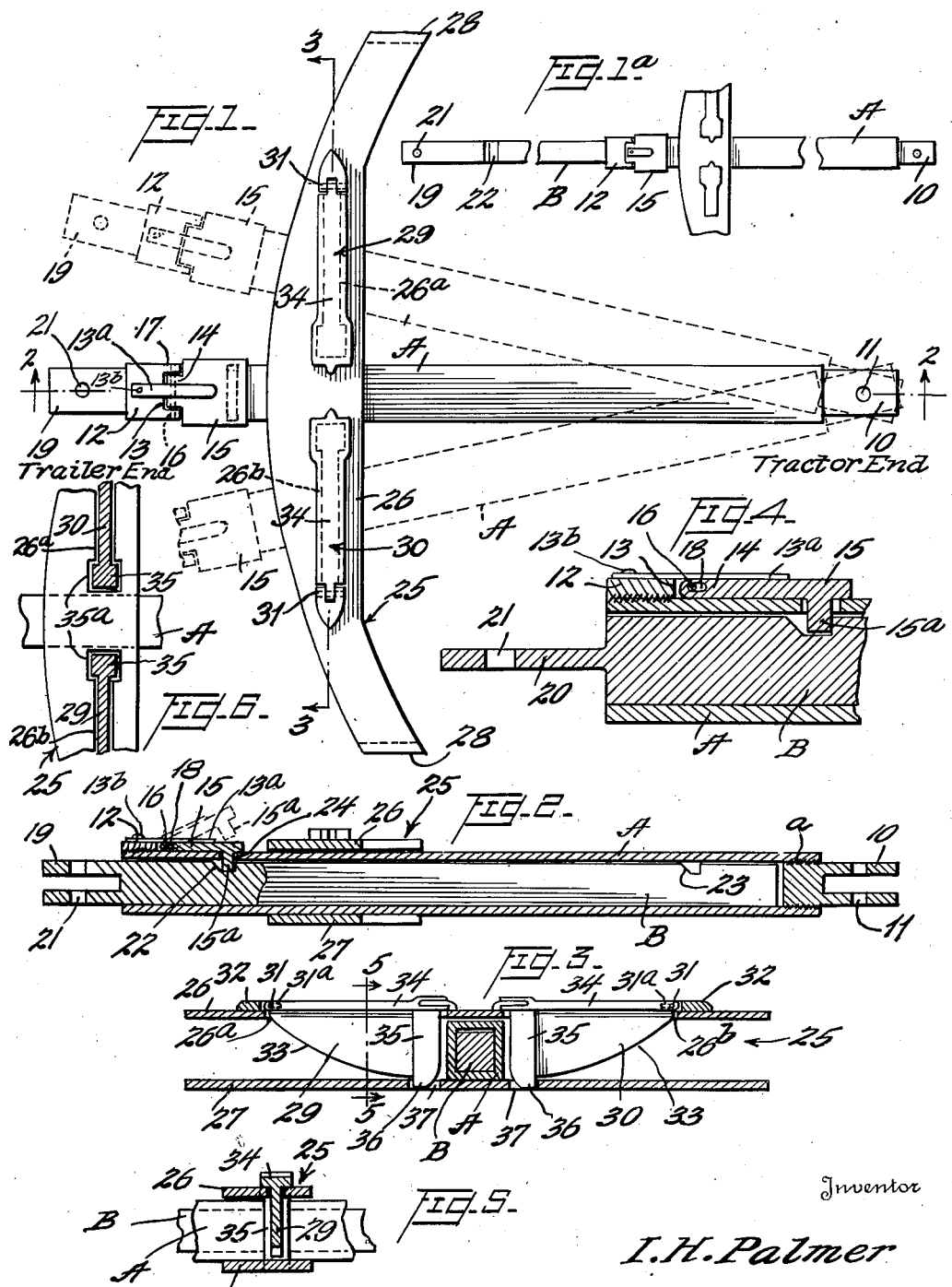
Inventor
I. H. Palmer
By Row & Row
Attorneys.

Sept. 5, 1944.   I. H. PALMER   2,357,540
COUPLING DEVICE
Filed June 29, 1943   2 Sheets-Sheet 2
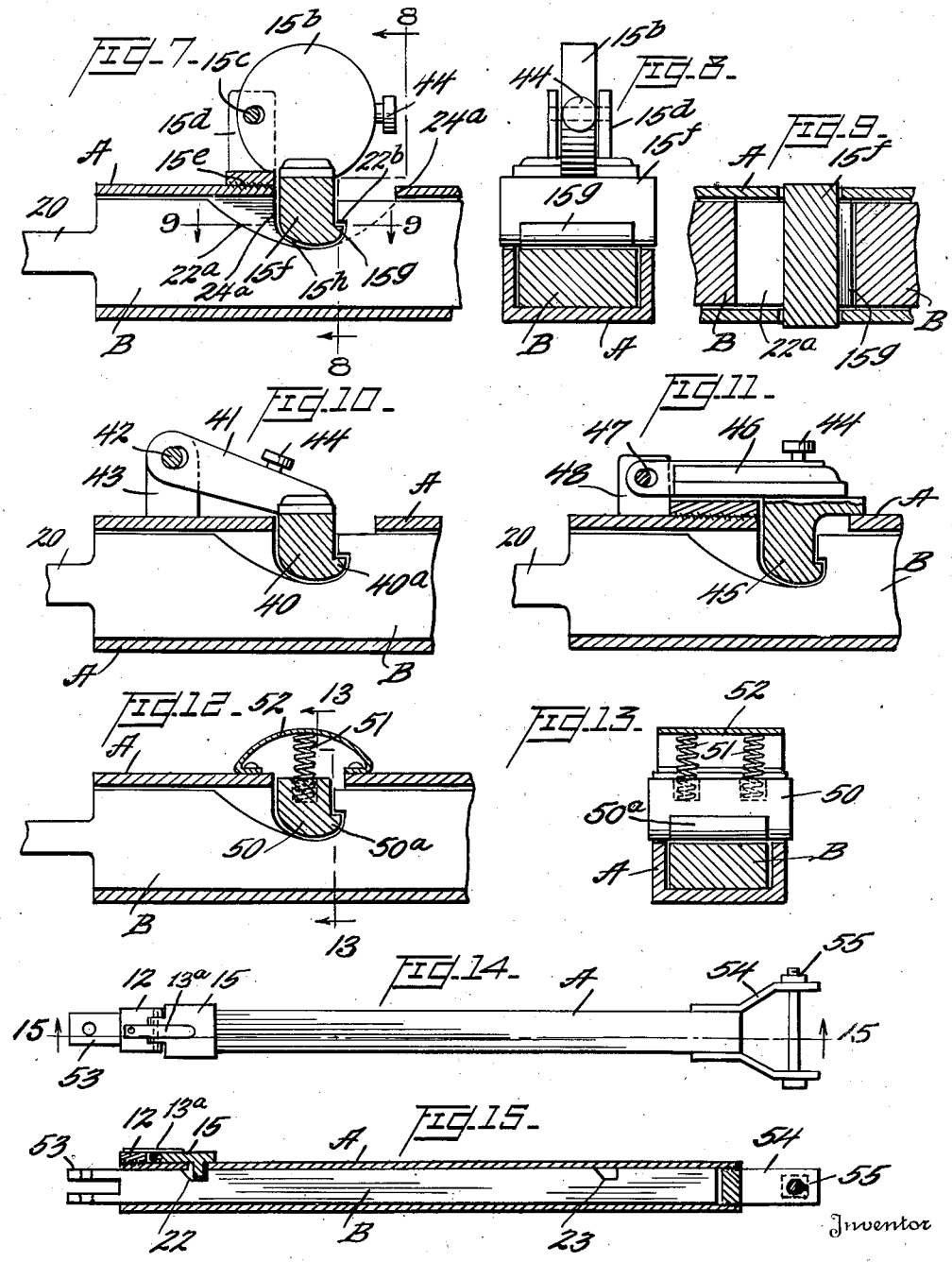

Patented Sept. 5, 1944

2,357,540

UNITED STATES PATENT OFFICE 2,357,540

COUPLING DEVICE

Irwin H. Palmer, Aberdeen, S. Dak.

Application June 29, 1943, Serial No. 492,727

7 Claims. (Cl. 280—33.12)

The present invention relates to coupling devices for automotive vehicles such as tractors and has for its objects to provide new and useful improvements in couplings of this character.

The improved coupling device is primarily designed for tractors wherein provision is made for convenient attachment of the coupling to a farm vehicle or piece of machinery, such as a binder or combine, to enable the same to be towed or drawn by the tractor to any desired locality. However, the invention is equally applicable to other uses such as a convenient connection between an automobile and trailer, or in any association wherein it is desirable to effect coupling between a power operated machine and one or more vehicles to be drawn by the former.

An important object of the invention is to provide an easy operable coupling device or tractor hitch wherein the device is capable of both transverse and longitudinal adjustment to the end that it is not necessary to accurately position the tractor relative to the machine or vehicle to be coupled thereto.

A further object is to provide a device of the character described wherein provision is made for imparting the towing strains directly to the draw bar proper and wherein the latter is automatically centered and held in straight-away towing position after the draft and towed vehicles are under way.

A still further object is to provide a coupling device, the component parts of which are of simple yet of rigid and durable construction and may be operated with facility and with a minimum of manual attention.

The instant improved coupling device is principally intended to facilitate the ease with which a tractor may be hitched to any vehicle or other piece of machinery to be pulled by it. The present method of coupling a tractor to any unit of machinery to be drawn by it is to back the tractor up to the tongue, for instance, of a binder. It is then necessary to raise the tongue and while it is being held up in a position to be connected with the draw bar on the tractor the tractor must be moved backwards carefully and accurately to within a fraction of an inch so that the pin may be inserted in the hole which is in the tractor draw bar and the end of the tongue. Where one person is now operating a tractor it is extremely difficult for him to couple to a heavy piece of machinery since he must stand on the ground, lift the tongue with one hand and handle the clutch of the tractor with the other while backing it up so that a connection can be made. The present invention obviates all of these difficulties.

Numerous other objects and advantages of the invention will be apparent as it is better understood from the following description, which taken in connection with the accompanying drawings, discloses a preferred embodiment thereof.

In said drawings:

Fig. 1 is a top plan view of an improved coupling device or tractor hitch constituting a preferred embodiment of the invention.

Fig. 1a is a view similar to Fig. 2 but drawn to a smaller scale, illustrating the composite draw bar elements in longitudinally extended towing position.

Fig. 2 is a longitudinal vertical sectional view through the device, taken substantially on line 2—2 of Fig. 1.

Fig. 3 is a similar view on line 3—3 of Fig. 1.

Fig. 4 is an enlarged detailed vertical sectional view through a portion of the coupling illustrated in the left hand of Fig. 2 but illustrating a tongue as distinguished from a clevis at the trailer end of the draw bar.

Fig. 5 is a vertical section on line 5—5 of Fig. 3.

Fig. 6 is a detail view partially in plan and partially in horizontal section, of a portion of the structure shown in Fig. 5.

Fig. 7 is a view similar to Fig. 4 but illustrating a slightly modified form of locking pawl or dog for the adjustable draw bar.

Fig. 8 is a vertical section on line 8—8 of Fig. 7.

Fig. 9 is a detailed horizontal section on line 9—9 of Fig. 7.

Fig. 10 is a view similar to Figs. 4 and 7 but illustrating another modified form of locking pawl or dog for the draw bar.

Fig. 11 is a similar view of a slightly varied modified form of a locking pawl or dog.

Fig. 12 is a view similar to Figs. 4, 7 and 9 with still another modified form of locking pawl or dog.

Fig. 13 is a vertical section on line 13—13 of Fig. 12.

Fig. 14 is a plan view of a slightly modified form of collapsible and extensible draw bar designed particularly for use as a trailer tongue and Fig. 15 is a longitudinal section on line 15—15 of Fig. 14.

For convenience in illustration, the tractor or towing vehicle and the trailer or vehicle to be towed have been omitted, it being understood that opposite ends of the coupling as illustrated are suitably connected to corresponding portions of the tractor and towed vehicle.

The easy coupling device generally comprises a two-part bar including an outer tubular sleeve member or casing A and an inner extensible member B preferably of solid construction. The inner end of the sleeve member A which is preferably of rectangular or square cross section, is welded or otherwise rigidly secured as at $a$ to a connecting element or clevis member 10 which in turn is apertured as at 11 for pivotal attachment to the axle or frame of the tractor (not shown). The outer end of the sleeve member or portion A of the draw bar is provided with an upstanding shoulder 12, preferably constituting a separate part welded or otherwise rigidly secured to the sleeve. The member 12 in turn is cut away as indicated at 13 to constitute a recess for the reception of the rear tail portion 14 of a pawl or dog 15 having a pivotal or hinged connection with the aforesaid sleeve portion 12. The dog or pawl at its forward end is provided with a depending locking projection or lug 15$a$ preferably extending the full width of the sleeve, the said pivotal connection between the parts 12 and 15 preferably comprising a pin or pintle 16 the opposite ends of which are rigidly secured in the shoulder portions 17 of the member 12. The intermediate portion of said pin in the locality of the recess 13 passes through a horizontally elongated aperture 18 in the dog 15. This construction permits limited longitudinal bodily movement of the pawl or dog relative to the sleeve for a purpose to be described. A flat spring member 13$a$ is riveted or otherwise secured at one end at 13$b$ to the rigid portion 12 of the draw bar sleeve member A and extends partially over the pawl or dog element 15. This spring has sufficient tension to prevent the pawl from being jolted out of locking or towing position with the inner bar member B during movement of the vehicles, but is sufficiently flexible to permit the pawl to be manually lifted when it is desired to disengage the draft connection between the sleeve and bar members A and B.

The inner member or bar B of the draw bar or coupling is illustrated in Fig. 2 as in fully retracted position and in Fig. 1$a$ as in fully extended position. Such bar is provided at its outer end with a suitable clevis 19 (Fig. 2) or tongue 20 (Fig. 4), respectively apertured at 21 for pivotal attachment or connection to the vehicle, piece of machinery or trailer to be coupled to the tractor for draft purposes. The inner bar member B is provided adjacent its outer end with a notch or recess 22 preferably extending for the full width of the bar on its top surface, and a similar notch or recess 23 is provided on the bar adjacent its inner or tractor end. The upper surface and a portion of the side walls of the outer sleeve member A is cut away, as at 24, adjacent its outer or rear end to permit the gravity and spring actuated pawl or dog 15 to pentrate therethrough into the notch or recess 22 of the inner movable bar member B when the latter is in retracted position as illustrated in Fig. 2. It will be apparent that when the inner bar member B is drawn outwardly or rearwardly in a longitudinal direction relative to the sleeve A, the said lug 15$a$ of the pawl will engage the forward recess 23 of the bar through the said aperture 24 of the sleeve to which latter the pawl is inseparably attached. This limits outward movement of the bar and normally prevents the same from being separated from the sleeve unless the pawl is manually elevated to permit such disassociation or dissembly.

A bracket or frame member 25 of sustantially arcuate configuration constitutes a part of or is attached at its opposite ends to the tractor frame, but its association with such frame has been omitted for convenience and simplicity in illustration. The said frame member 25 includes an upper plate member 26 and a lower plate member 27 secured together at their opposite ends by vertical walls or webs 28. The said bracket member 25 is adapted to receive and house between the walls 26, 27 thereof for horizontal or lateral swinging movement in opposite directions, the outer end of the composite draw bar assembly A, B. The draw bar is supported by the lower bracket wall 27 and upward displacement of the bar is prevented by the upper bracket wall 26.

The intermediate portion of the upper bracket wall 26 is cut away at spaced localities 26$a$, 26$b$ for the projection therethrough of complementary hinged latch members 29, 30. The said latch members are of identical construction and each is loosely pivoted at its outer end as indicated by the pintle 31, to a rigid portion or shoulder 32 or directly to the bracket wall 26, each preferably having an elongated slot 31$a$ therein for the reception of the pintle 31. Each slot 26$a$, 26$b$ terminates at one end in an enlarged or squared portion 35A (Fig. 6), for the reception of a squared head portion 35 at the forward or free end of each latch member. Each latch member 29, 30 further includes a central vertical web having a lower curved edge 33 and an upper horizontally disposed web 34 of greater width than and extending at right angles to the central depending web of the latch members. The head portions 35 of the said latch members are designed respectively for loose engagement with opposite sides of the draw bar sleeve A when the latter is in centralized longitudinal towing position relative to the tractor and drawn vehicle. The lower end of each latch head 35 is of reduced dimension as indicated at 36 for locking engagement with suitable cut away portions or apertures 37 in the lower bracket wall 27. The described structure results in a gradually curved outer surface of each latch member 29, 30 to permit the same to be raised manually or automatically on their pivotal connections 31 into elevated position out of engagement with the draw bar, with a minimum of friction. When it is desired to swing the draw bar on its supporting bracket so as to adjust the bar for coupling to a vehicle or piece of farm machinery, it is merely necessary to manually elevate one of the latch members 29, 30 out of engagement with the bar, depending upon which direction from its normal central position on the bracket, it is desired to move and adjust the bar. Fig. 1 shows in dotted lines an adjustment of the bar from its normal central or longitudinal position relative to the tractor and towed vehicle. Fig. 3 shows both latch members in locking position to hold the draw bar against transverse or lateral displacement as when the vehicle is being towed. This prevents switching and swerving of the trailer or farm machinery while being transferred from one locality to another. It will be understood that when the draw bar is being adjusted laterally in a horizontal plane for coupling purposes, it is moved relative to its supporting bracket 25 on its pivotal connection 11 with the tractor or draft vehicle. The described loose hinge connection between pintle 31 and elongated slot 31a on the bracket member 25 is of the same general character described in respect to the loosely hinged locking pawl or dog 15, so as to impart all latching strains of the elements 29, 30 to the latch parts 35 and enlarged slotted portions 35a of the bracket wall 26. This relieves the hinge pintles 31 of all strains which may otherwise be imparted thereto by the tendency of the latched draw bar to swing or move laterally on and relative to the bracket member 25.

In the operation of the improved coupling device the tractor or other towing vehicle is backed or otherwise moved into the general locality of the tongue or draft bar of the farm machinery. The operator may then release one of the latch members 29, 30 and swing the composite draw bar in the general direction of the vehicle to be towed. He may then lift the pawl or dog 15 so as to permit the extensible or solid draw bar to be drawn rearwardly in telescoping relation to the sleeve member A, and in this manner obtain the desired registry of the apertured clevis 19 with a corresponding apertured portion in the forward end of the farm machinery tongue. After the coupling has been thus effected the tractor is started up and moved with the towed vehicle until both vehicles are in substantial longitudinal alignment. The composite draw bar A, B automatically moves toward a central position relative to the bracket member 25 while lifting the adjacent latch member 29, 30 due to the curved engaging lower surface 33 of the latter. When the draw bar contacts the remaining latch member 29, 30 which has not been disturbed, the lifted latch member will drop by gravity behind the draw bar and hold the latter in rigid centralized position as best seen in Figs. 1 and 3 of the drawings.

It will be understood that the initial towing of the vehicle takes place by reason of engagement of pawl 15 with the rearmost transverse recess 23 in the solid draw bar when the latter is in extended position as shown for example in Fig. 1a. After the vehicles are in substantial locked longitudinal alignment as described, the tractor may be backed toward the towed vehicle thereby automatically releasing pawl 15 from notch 23 due to the inclined sloping wall at the rear of the notch. This backing movement is continued with accompanying inward telescoping movement of the bar and sleeve until the pawl again drops into the notch 22 of the inner draw bar element B, whereupon the two vehicles are in desirable closely coupled relation and may then be moved as a unit to any desired locality. It will be understood that the tractor may be backed toward the tow vehicle immediately upon effecting the coupling and before the tractor has been moved ahead, whereby the pawl 15 will drop into notch 22 of the inner draw bar element B. Thereafter upon the tractor being moved ahead the outer and inner draw bar elements A, B will assume a central location relative to the bracket member 25, at which time one of the dogs or latch elements 29, 30 will automatically fall into position and hold the bar rigidly in such localized central or longitudinal position. This procedure may be followed under conditions where the tongue of the towed vehicle or combine is exceptionally heavy and difficult to handle.

Due to the described loose pintle and slot hinge connection 16, 18, between the pawl 15 and shoulder 12 of sleeve A, all towing strains are placed directly between the pawl lug 15a and the draw bar as well as between said pawl and the top of sleeve A, and to some extent by the rigid shoulder 12 on the sleeve. In this manner no towing strains are absorbed by or imparted to the hinge pintle 16 of the pawl.

It will thus be seen that a very flexible and universal yet rigid coupling connection is provided between the tractor or draft vehicle and the farm machinery or trailer to be coupled and towed thereby. The longitudinal extent of the bracket member 25 together with the pivotal connection 11 of the composite draw bar with the tractor, affords a considerable latitude in horizontal swinging movement of the bar. The material distance between the draw bar notches 22, 23 affords a considerable range of longitudinal adjustment in coupling the vehicles by extension of the inner draw bar element B in telescoping relation to the outer sleeve element A.

Figs. 7, 8 and 9 show a modification of the pawl member 15 wherein the latter comprises a locking member or bar 15b loosely pivotally mounted at 15c on or between one or more lugs or shoulder elements 15d welded or otherwise rigidly secured as at 15e to the sleeve member A. The locking member 15b includes a depending foot member 15f in turn including a locking tow extension 15g. This locking projection 15f is designed to engage within and beneath a shouldered recess 22a in the inner draw bar element B, the shouldered portion of said recess being indicated at 22b. This prevents the pawl from being jolted out of its desired locking engagement. The rear portion of the recess is of gradually curved or rounded configuration as is also the lower wall 15h of the pawl locking projection 15f so that when the hitch is being collapsed by a backing motion of the tractor it will slide easily upon the top of the inner draw bar member B. The locking projection 15f of oscillating locking member 15b is of sufficient longitudinal extent to engage both the top and side walls of the square sleeve member A, as best seen in Fig. 9, so as to more uniformly transmit towing strains as well as to generally increase the strength and rigidity of the connections. The recess 24a in sleeve member A is of sufficient extent to permit the locking portion or projection 15f of the pawl to clear the recess when rocked upon the hinge connection 15c when it is desired to uncouple or disengage the connection. The said hinge connection 15c is also of a loose or floating character for the same reason as above explained in respect to the preferred embodiment whereby strains are taken off the hinge pintle and imparted by the pawl 15b, 15f directly to the component parts A, B of the composite draw bar.

Fig. 10 illustrates a further modification of the locking member or pawl wherein the latter constitutes a straight transverse bar member 40 having a toe or projection 40a provided for the same purpose in respect to the locking member or pawl illustrated in Figs. 7, 8 and 9 and prevents the pawl from being jarred or jolted out of locking engagement with the draw bar. Said pawl 40 is rigidly secured to the outer end of a lever member 41 having a loose or floating hinge connection 42 with a lug or bracket 43 on the sleeve A and may be lifted and swung by means of a hand projection 44 out of engagement with the inner bar element B of the draw bar. This handle or projection 44 is also present in the embodiment illustrated in Figs. 7, 8 and 9.

In Fig. 11 of the drawings the corresponding pawl member 45 is carried at the forward end of a substantially flat bar or lever 46 having a loose or floating hinge connection 47 with a bracket 48 rigidly secured to the sleeve member A. This construction may be employed in lieu of the other pawl embodiments since all stresses and strains are exerted in a strict longitudinal direction as will be apparent.

In Figs. 12 and 13 of the drawings the pawl member 50, having a locking projection 50a, constitutes a straight transverse bar having substantially the engagement with the inner draw bar element B and outer sleeve member A as hereinabove described but wherein no hinge connection is present. The bar is confined against displacement by means of spaced coil springs 51 each bearing against a suitable recess in the bar and at their upper ends against a cover plate 52 removably attached to the outer sleeve member A. It is contemplated that this pawl member 50 may be manually detached and slipped out of engagement with the draw bar elements when it is desired to effect longitudinal adjustment or telescoping extension of the inner draw bar element relative to the sleeve.

In Figs. 14 and 15 the composite draw bar is substantially of the character previously described but wherein the tractor end of the bar whereby a pivotal connection is to be effected is indicated at 53. The opposite end of the outer sleeve element A is provided with a clevis member 54 and bolt 55 whereby a convenient coupling or attachment of this portion of the draw bar with a trailer axle may be readily effected.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the various forms hereinbefore described constituting merely preferred embodiments thereof.

What I claim is:

1. In a coupling device the combination of an outer sleeve member adapted to be pivotally secured at its inner end to a towing vehicle, an inner extensible bar member slidably mounted within said sleeve and adapted to be secured at its outer end to a vehicle to be towed, a bracket member secured to the frame of the towing vehicle for supporting said sleeve for swinging movement thereon in a horizontal plane, and a bodily movable locking pawl also hingedly and pivotally mounted by means of a pin and slot connection on said sleeve member, the outer free end of said pawl being selectively engageable through an aperture in the sleeve member with longitudinally spaced notches on said bar member, the said bodily movable pivotal mounting of said pawl relative to said sleeve being of a loose floating character to relieve said pawl hinge pin of towing strains and to impart such strains directly to said sleeve through the outer free bar member engaging end of said pawl.

2. In a coupling device the combination of an outer sleeve member adapted to be pivotally secured at its inner end to a towing vehicle, an inner extensible bar member slidably mounted within said sleeve and adapted to be secured at its outer end to a vehicle to be towed, a bracket member including upper and lower vertically spaced horizontally disposed apertured plate elements secured to the frame of the towing vehicle for supporting said sleeve for swinging movement thereon in a horizontal plane, a locking pawl hingedly and pivotally mounted by means of a pin and slot connection on said sleeve member, said pawl being bodily movable relative to said sleeve member and having its outer free end selectively engageable through an aperture in the sleeve with longitudinally spaced notches on said inner bar member, the said bodily movable pivotal pin and slot mounting of the pawl on and relative to the sleeve being of a loose floating character to relieve said pawl hinge pin of towing strains and to transmit and impart such strains directly to the sleeve through the outer free bar member engaging end of said pawl, and a pair of complimentary opposed latch members loosely and pivotally mounted on said bracket member by means of a pin and slot connection and respectively engageable with said sleeve member for normally maintaining the same in a central position on the bracket member, the outer free ends of said latch members when in latching position extending into the apertures of said upper and lower plate elements to relieve the pivotal mountings of the latch members of shifting strains by the draw bar and to transmit such strains directly to said plate elements to be absorbed thereby.

3. In a coupling device, the combination of a bracket member mounted on and extending transversely of the rear of the towing vehicle, said bracket member comprising upper and lower vertically spaced horizontally disposed apertured plate elements, an extensible draw bar pivotally mounted at its inner end on said towing vehicle and disposed adjacent its outer end between the plate elements of said bracket member, and a pair of spaced latch members pivotally mounted on the upper plate element of said bracket member on opposite sides of said draw bar, said latch members each including a depending inclined flange wall respectively engageable by said draw bar when the latter is moved to normal central position on said bracket member, whereby said latch members are respectively automatically elevated by said draw bar and permitted to drop by gravity into latching position against said draw bar when the latter moves into said central position, the outer free ends of said latch members when in latching position extending into the apertures of said upper and lower plate elements to relieve the pivotal mountings of the latch members of shifting strains by the draw bar and to transmit such strains directly to said plate elements to be absorbed thereby.

4. In a coupling device, the combination of a bracket member mounted on and extending transversely of the rear of the towing vehicle, said bracket member including upper and lower vertically spaced horizontally disposed apertured plate elements, an extensible draw bar pivotally mounted at its inner end on said towing vehicle and supported adjacent its outer end by the lower plate of said bracket member, and a pair of spaced latch members pivotally mounted on the upper plate of said bracket member on opposite sides of and engageable with said draw bar, each of said latch members having a bodily movable hinge connection on and relative to the upper plate element of said bracket member so that lateral shifting strains of said draw bar on its pivotal mounting are transmitted directly to and absorbed by said bracket member independently of said hinge connection, said latch members each including a depending inclined flange wall respectively engageable by said draw bar when the latter is moved laterally to normal central position on said bracket member, whereby said latch members are respectively automatically elevated by said draw bar and permitted to drop by gravity into latching position against said draw bar when the latter moves into said central position.

5. A coupling device of the character defined in claim 1 wherein said bodily movable locking pawl has a loose rotatable hinge connection on said sleeve member for the purposes described.

6. A coupling device of the character defined in claim 1 wherein said bodily movable locking pawl is carried by the outer end of a lever element mounted on and extending substantially parallel to said sleeve member.

7. A coupling device of the character defined in claim 1 wherein said bodily movable locking pawl is unattached to and extends transversely for the full width of said sleeve member and has a spring pressed engagement with said bar member, whereby said pawl may be manually removed from and lifted out of engagement with said sleeve and bar members.

IRWIN H. PALMER.